US011720661B2

United States Patent
Hastings

(10) Patent No.: US 11,720,661 B2
(45) Date of Patent: Aug. 8, 2023

(54) WIRELESS MULTI-FACTOR AUTHENTICATION BASED ON PROXIMITY OF A REGISTERED MOBILE DEVICE TO A PROTECTED COMPUTING DEVICE AT ISSUE

(71) Applicant: Fortinet, Inc., Sunnyvale, CA (US)

(72) Inventor: Eric C. Hastings, Austin, TX (US)

(73) Assignee: Fortinet, Inc., Sunnyvale, CA (US)

( * ) Notice: Subject to any disclaimer, the term of this patent is extended or adjusted under 35 U.S.C. 154(b) by 567 days.

(21) Appl. No.: 15/845,263

(22) Filed: Dec. 18, 2017

(65) Prior Publication Data

US 2019/0188368 A1     Jun. 20, 2019

(51) Int. Cl.

| G06F 21/35 | (2013.01) |
| H04L 9/40 | (2022.01) |
| G06F 21/43 | (2013.01) |
| H04W 4/80 | (2018.01) |
| H04W 12/06 | (2021.01) |
| H04W 4/02 | (2018.01) |

(52) U.S. Cl.
CPC .............. *G06F 21/35* (2013.01); *G06F 21/43* (2013.01); *H04L 63/0272* (2013.01); *H04L 63/0492* (2013.01); *H04L 63/08* (2013.01); *H04W 4/80* (2018.02); *H04L 2463/082* (2013.01); *H04W 4/023* (2013.01); *H04W 12/06* (2013.01)

(58) Field of Classification Search
CPC .......... G06F 21/35; G06F 21/43; H04W 4/80; H04W 12/06; H04W 4/023; H04W 4/021; H04L 63/08; H04L 63/0492; H04L 63/0272; H04L 2463/082
See application file for complete search history.

(56) References Cited

U.S. PATENT DOCUMENTS

| 8,295,898 B2 * | 10/2012 | Ashfield ............ G06Q 20/3224 455/456.1 |
| 9,350,717 B1 * | 5/2016 | Siddiqui ................. H04L 63/08 |
| 2008/0207217 A1 * | 8/2008 | Ramanathan ......... H04W 4/029 455/456.1 |

OTHER PUBLICATIONS

C. Rigney et al. "Remote Authentication Dial in User Service (RADIUS)." Network Working Group. Jun. 2000, 76 pgs.
C. Rigney. "RADIUS Accounting." Network Working Group. Jun. 2000, 28 pgs.

* cited by examiner

*Primary Examiner* — Jeffrey D. Popham
(74) *Attorney, Agent, or Firm* — HDC Intellectual Property Law, LLP

(57) ABSTRACT

Systems and methods for a passive wireless multi-factor authentication approach are provided. According to one embodiment, a user authentication request is received by a first computing device connected to a private network. The user authentication request is sent by an endpoint protection suite running on the first computing device to an authentication device associated with the private network. A proximity of a second computing device, which was previously registered with the authentication device to be used as a factor of a multi-factor authentication process involving the first computing device, is determined by the authentication device in relation to one or more wireless access points of a wireless network of the private network. The user authentication request is then processed by the authentication device based on the proximity.

10 Claims, 8 Drawing Sheets

WIRELESS MULTI-FACTOR AUTHENTICATION BASED ON PROXIMITY OF A REGISTERED MOBILE DEVICE TO A PROTECTED COMPUTING DEVICE AT ISSUE

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright ©2017, Fortinet, Inc.

BACKGROUND

Field

Embodiments of the present invention generally relate to user authentication and multi-factor authentication. In particular, embodiments of the present invention relate to wireless authentication of an access request based on the proximity of two electronic/computing devices.

Description of the Related Art

It has been observed that password-based authentication alone is inadequate to avoid cyber threats on a protected network. Password-only authentication has led to security breaches, malware infections, and policy violations. To overcome the limitations of password-based authentication, two-factor authentication or multi-factor authentication have been proposed. With two-factor authentications or multi-factor authentication, a user is granted access to a secure (protected) resource only after successfully presenting multiple separate pieces of evidence to an authentication mechanism in order to provide enhanced security. Typically, the pieces of evidence include at least two of the following categories: a knowledge factor (something the user knows, e.g., a password, an answer to a secret question or a personal identification number (PIN)), a possession factor (something the user has, e.g., a hardware security token) and an inherence factor (something the user is, e.g., a physical characteristic of the user, such as a fingerprint, eye iris, voice, typing speed, pattern in key press intervals, etc.).

Most existing two-factor authentication and multi-factor authentication mechanisms require a dedicated hardware device (e.g., a special purpose hardware token) to be carried by the user. These hardware tokens are used to generate a unique code, for example, a One-Time Password (OTP) that is used in combination with one of the other factors to authenticate the user at issue in connection with a request to access or log into a protected device, for example. Advances in two-factor authentication now allow a mobile phone to securely and effectively serve as the possession factor in a mobile two-factor authentication mechanism, thereby freeing users from carrying additional items with them at all times. While it is more convenient for a user to use a mobile phone as the possession factor, it still requires the active participation of the user to read a code presented on their mobile phone and to enter the code into the computing device into which they are attempting to log into.

Therefore, there exists a need for a more automated form of multi-factor authentication that does not require the active participation or engagement of the user.

SUMMARY

Systems and methods are described for a passive wireless multi-factor authentication approach. According to one embodiment, a user authentication request is received by a first computing device connected to a private network. The user authentication request is sent by an endpoint protection suite running on the first computing device to an authentication device associated with the private network. A proximity of a second computing device, which was previously registered with the authentication device to be used as a factor of a multi-factor authentication process involving the first computing device, is determined by the authentication device in relation to one or more wireless access points of a wireless network of the private network. The user authentication request is processed by the authentication device based on the proximity, including when the proximity is within a preconfigured radius, the authentication device sends an affirmative response to the endpoint protection suite accepting the user authentication request and when the proximity is outside of the preconfigured radius, the authentication device sends a negative response to the endpoint protection suite rejecting the user authentication request.

Other features of embodiments of the present invention will be apparent from the accompanying drawings and from the detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1A:
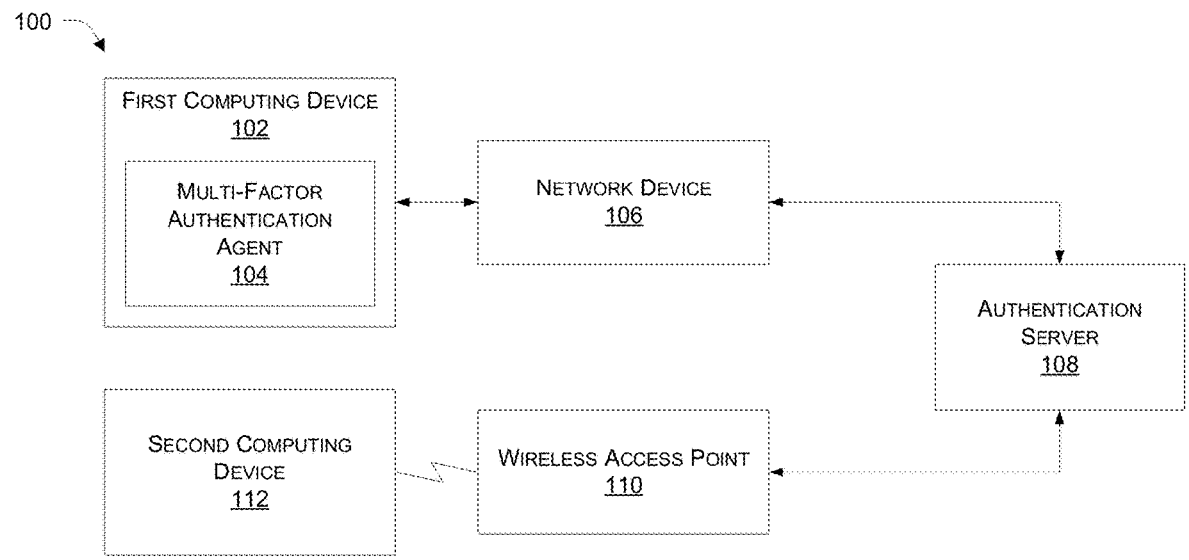
FIG. 1A illustrates a simplified wireless network architecture in which wireless multi-factor authentication may be performed in accordance with an embodiment of the present invention.

Systems and methods are described for a passive wireless multi-factor authentication approach. In the following description, numerous specific details are set forth in order to provide a thorough understanding of embodiments of the present invention. It will be apparent to one skilled in the art that embodiments of the present invention may be practiced without some of these specific details.

Described herein is an authentication mechanism based on proximity of a companion device, which may also be referred to hereafter as a second computing device, to a primary device, which may also be referred to hereafter as a first computing device. According to one embodiment, the proximity of a registered companion device (e.g., a smartphone carried by the user) to a primary device is used as one factor (e.g., the possession factor) of potentially multiple factors for authenticating the user on the primary device. In some embodiments, an endpoint protection suite (for example, a FORTICLIENT endpoint security application available from the assignee of the present invention) running on the first computing device and incorporating or otherwise interacting with a local two-factor authentication (2FA) agent receives a user authentication request from a user, and forwards the user authentication request to an authentication device (for example, a FORTIAUTHENTICATOR network authenticator available from the assignee of the present invention). In some embodiment, on receiving the user authentication request, the authentication device initiates a process to determine the proximity of a second computing device to one or more wireless access points providing wireless connectivity to the first computing device, and processes the user authentication request based on the proximity of second computing device to the one or more wireless access points. In some embodiment, the authentication device sends an affirmative response to the endpoint protection suite of the first computing device to grant access to the user, if the proximity of the second computing device to the one or more wireless access points is within a preconfigured radius. In some embodiments, the endpoint protection suite on the first computing device approves the user authentication request on receipt of the affirmative response from the authentication device. The second computing device is the one that is associated with the first computing device during an enrollment process performed by an authentication device that processes user authentication requests received at the first computing device.

For example, a 2FA agent configured on a laptop may receive a user authentication request and forward the user authentication request to an authentication server. The authentication server can initiate the process of identifying the proximity of a pre-registered mobile phone (or other hand-held wireless device) to one or more wireless access points providing wireless connectivity to the laptop within an enterprise's wireless network, for example. If the authentication server determines that the mobile device is within a preconfigured radius of the one or more wireless access points, the authentication server can send an affirmative response to the endpoint protection suite which in turn can approve the user authentication request.

In some embodiments, the preconfigured radius may be determined, during registration, enrollment or pairing (association) of a second computing device with the first computing device, based on an average distance of the second computing device to one or more wireless access points associated with the network device providing wireless network connectivity to the first computing device during the registration, enrollment or pairing (association) of the second computing device with the first computing device. The preconfigured radius is therefore used as an indicator of a normal distance of the second computing device from the first computing device while the end user is interacting with the first computing device.

In some embodiments, the network device providing network (e.g., wired or wireless) connectivity to the first computing device can be a firewall or a router or a gateway or a network switch or a hub or a wireless access point.

As one may appreciate, in some embodiments, the first computing device may be connected to a wired interface, and in some other embodiments, the first computing device may be connected through the wireless interface. In embodiments, where the first computing device is a desktop computer or a server like device that is generally fixed at a particular location, the proximity of the second computing device is determined with respect to one or more wireless access points located near a network device providing network connectivity to the first computing device. In some embodiments, where the first computing device is a movable or portable device or a wireless device, the proximity of the second computing device is determined with respect to the first computing device. In one embodiment, the proximity of both the first computing device and the second computing device from one or more wireless access points can be determined, and user authentication request can be approved, if both the first computing device and the second computing device are within the pre-configured radius.

In some embodiments, the proximity of the second computing device to one or more wireless access points is determined based on time-in-flight of a distance-measuring signal sent from the authentication device to the second computing device via the wireless access points. In order to calculate the distance of the user from the one or more wireless access points, a triangulation technique can be used. The authentication device can send a distance measuring signal to the second computing device, directed through one or more access points associated with the network device providing network connectivity to the first computing device. The distance-measuring signal can be a ping command or a specific message containing some details of the user authentication request. The second computer can acknowledge the distance measuring signal and route the acknowledgement message through one or more access points to the authentication device. The time taken by the distance measuring signal to reach the second computing device from via the one or more access points and/or the time taken to receive the acknowledgement message in response to the distance measuring signal can be used to determine the distance of the second computing device from one or more wireless access points.

In some embodiments, to add another factor of authentication, the endpoint protection suite of the first computing device sends a push notification to the second computing device and approves the user authentication request on receipt of affirmative confirmation acknowledgement of the push notification from the second computing device. The push notification may include an identifier of the first computing device and an identifier of a user associated with the user authentication request.

In some embodiments, the first computing device can be a desktop computer, a workstation, a storage device, a network server, a laptop computer, a wearable device, a tablet, a mobile phone, a portable device, or a wireless computing device. In some embodiments, the second computing device can be a mobile phone, a portable hardware token, a laptop, a tablet or a wearable device of the end user or a microchip implanted within the end user.

As one may appreciate, the first computing device can be a wireless computing device or a wired computing device. In one embodiment, when the first computing device is a wired computing device, the proximity of the second computing device to the first computing device (or to the location at which the second computing device was during the registration, pairing (association) or enrollment process) is determined based on one or more access points located near the network device providing network connectivity to the first computing device.

In embodiments, in which the first computing device is a wired computing device, the proximity of the second computing device during the authentication process is determined based on the same set of one or more wireless access points that was used to determine the average distance of the second computing device from the one or more wireless access point during the registration process. In one embodiment, in which the first computing device is a wireless computing device (and therefore its location will likely change frequently), the proximity of the second computing device to the first computing device is determined by one or more wireless access points near the first computing device.

In some embodiments, the user authentication request may be part of a multi-factor authentication process. In some embodiments, the user authentication request may be initiated as result of an affirmative response by the first computing device to a first factor authentication, for example, the end user successfully providing proper login credentials to the first computing device.

In some embodiments, the authentication device can be a dedicated authentication server, a network security device, a firewall, a router, a switch, a gateway, a network based authentication device, a network server or a wireless access point. In some embodiments, the one or more wireless access points can be a wireless router or a cellular network tower.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, e.g. ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, e.g. software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

The phrase "authentication device" generally refers to a specialized or dedicated device for use on a network in virtual or physical form to enable authentication of a user on a computing device. The authentication device can be the same computing device on which user needs to be authenticated or can be a network based device. For example, an authentication server or any other network device. Some authentication device may be implemented as general-purpose computers with appropriate software configured for the particular functions to be provided by the authentication device; others include custom hardware (e.g., one or more custom Application Specific Integrated Circuits (ASICs)). An example of an authentication device is a FORTIAUTHENTICATOR network authenticator, one of the FORTIGATE family of network security appliances or one of the FORTICARRIER family of consolidated security appliances. Features of the authentication device can be implemented on a network device, like a firewall, gateway, router, switch etc.

Although the present disclosure has been described with reference to device proximity based authentication, it should be appreciated that the same has been done merely to illustrate the invention in an exemplary manner and any other purpose or function for which the explained structure or configuration can be used, is covered within the scope of the present disclosure.

Exemplary embodiments will now be described more details hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided using dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the technique being selectable by the entity implementing this invention. Those of ordinary skill in the art further understand that the exemplary hardware, software, processes, methods, and/or operating systems described herein are for illustrative purposes and, thus, are not intended to be limited to any named terms.

Embodiments described herein relate to wireless multi-factor authentication. The wireless multi-factor authentication is processed based on proximity of a registered companion device to a protected computing device or to a location recorded during an enrollment process during which the companion device was registered (associated) with the protected computing device.

FIG. 1A illustrates a simplified wireless network architecture in which wireless multi-factor authentication may be performed in accordance with an embodiment of the present invention. As shown in FIG. 1A, a first computing device 102, which may also be referred to interchangeably as a primary device, may have a multi-factor authentication agent 104 (e.g., a standalone agent or an agent that is part of an endpoint protection suite) running therein to enable authentication of a user attempting to access (e.g., login to) first computing device 102 based on the proximity of a second computing device 112 to first computing device 102. Multi-factor authentication agent 104 may use any or a combination of a knowledge factor, a possession factor and an inherence factor to authenticate a user on first computing device.

FIG. 1A illustrates a scenario in which first computing device 102 may be connected to a network through a physical (e.g., a wired connection via an Ethernet port (not shown) of first computing device 102). Depending upon the particular environment or implementation, first computing device 102 may represent a server, a desktop computer, a printer, a scanner, a vending machine, a kiosk or the like. In one embodiment, using multi-factor authentication agent 104, second computing device 112 can be configured to work as a companion device, the presence of which proximate to first computing device 102 can be used as one of multiple authentication factors to authenticate a user for access to first computing device 102.

As those skilled in the art will appreciate, in existing systems, the proximity of two devices may be determined using wireless technology for exchanging data over short distances, like Bluetooth, ZigBee, Near Field Communication (NFC) and the like. To enable a proximity based authentication mechanism through such techniques, however, hardware modifications may be required. Embodiments of the present invention enable proximity-based authentication without requiring such expensive changes to hardware.

In an embodiment, during a registration phase or device pairing phase, second computing device 112 (e.g., a smartphone, a tablet or other portable wireless device) can be configured to be recognized as a companion device associated with first computing device 102. As a companion device associated with first computing device, the proximity of the companion device to first computing device 102 can subsequently be used as one of multiple factors for authenticating the user for access to first computing device 102. Pairing information, which may also be referred to as registration information, can be stored on an authentication device (e.g., authentication server 108). During the registration phase, while the user is in front of first computing device 102 and second computing device 112 is connected to the wireless network via wireless access point 110, the user can use multi-factor authentication agent 104 or a soft token management system (e.g., an Open Authentication (OATH)-compliant, event-based and time-based One Time Password (OTP) generator mobile application, such as FORTITOKEN MOBILE, which is available from the assignee of the present invention) (not shown) running on second computing device 112 to register second computing device 112 with first computing device 102.

When registering second computing device 112 via multi-factor authentication agent 104, multi-factor authentication agent 104 may send a registration request to authentication server 108 including unique device identification information (e.g., a mobile device identifier, a Universally Unique Identifier (UUID) of an Android device, a Unique Device Identifier (UDID) of an iOS device, a Media Access Control (MAC) address or the like) of first computing device 102 and of second computing device. Responsive to the registration request, authentication server 108 uses "time in flight" data sent from network device 106 (e.g., a FORTIGATE network security appliance available from the assignee of the present invention) and/or wireless access point 110 to determine a distance from wireless access point 110 the user is at the time of enrollment/registration. This delay or latency may be averaged over a few seconds to account for variations. For example, authentication server 108 can send a distance measuring signal (e.g., a ping command) through wireless access point 110 and determine turn-around time (TAT) or time-in-flight (TiF) between one or more wireless access points (e.g., wireless access point 110) and second computing device 112 based on response time or acknowledgement time. Authentication server 108 then stores registration information (including the unique device identification information of second computing device 112 and the distance) and associates it with the unique device identification information of first computing device 102 for use during subsequent multi-factor authentication involving first computing device.

In some embodiments, authentication server 108, through multiple iterations of TAT or TiF calculations, can determine an average distance of second computing device 112 from wireless access point 110. In one embodiment, TAT can be determined iteratively during the registration phase, between one or more access points located near network device 106 and second computing device 112 and an average distance of second computing device from each of the one or more access points can be stored by authentication server 108. The average distance of second computing device 112 from the one or more access points may be referred to herein as the average radial distance and the value of the average radial distance stored within the registration information by authentication server 108 may be referred to as the pre-configured radius. Triangulation technique or other similar distance measuring technique can be used to determine a pre-configured radius.

When registering second computing device 112 via a soft token management system installed on second computing device 112, the process is similar to that described above, but the registration request is sent to authentication server 108 from the soft token management system.

In general, after second computing device 112 has been registered with first computing device 102, during a subsequent login attempt at first computing device 102, multi-factor authentication agent 104 can send the user authentication request to the authentication server 108. Responsive to receiving the user authentication request, authentication server 108 can determine the current distance of second computing device 112 from wireless access point 110 and determine whether the current distance is within the pre-configured radius. If the determined distance of second computing device 112 from wireless access point 110 is within the pre-configured radius, the user authentication request can be approved. Authentication server 108 can then instruct multi-factor authentication agent 104 to approve the user authentication request.

In one embodiment, responsive to the subsequent login attempt at first computing device 102, multi-factor authentication agent 104 sends a Remote Authentication Dial In User Service (RADIUS) challenge to authentication server 108, which in turn performs a look up to identify the registered companion device (e.g., second computing device 112) and sends a push notification to the registered companion device. In one embodiment, the registered companion device responds to the push notification automatically and in the background to authentication server 108 (thereby requiring no user intervention). In alternative embodiments, a response to the push notification can be triggered by user confirmation of the push notification. Authentication server 108 then accepts or rejects the RADIUS challenge based on one or more distance measurements associated with the registered companion device as compared to those stored during the registration process. In one embodiment, the TiF delay during login can be accepted when it is within a predetermined or configurable threshold to that of the TiF delay measured during the registration process as a small deviation would still be indicative of the registered companion device being within close proximity to first computing device 102. RADIUS is an industry standard protocol described in Request for Comments (RFC) 2865, "Remote Authentication Dial-in User Service (RADIUS)," and RFC 2866, "RADIUS Accounting" both of which are hereby incorporated by reference in their entirety for all purposes.

Figure 1B:
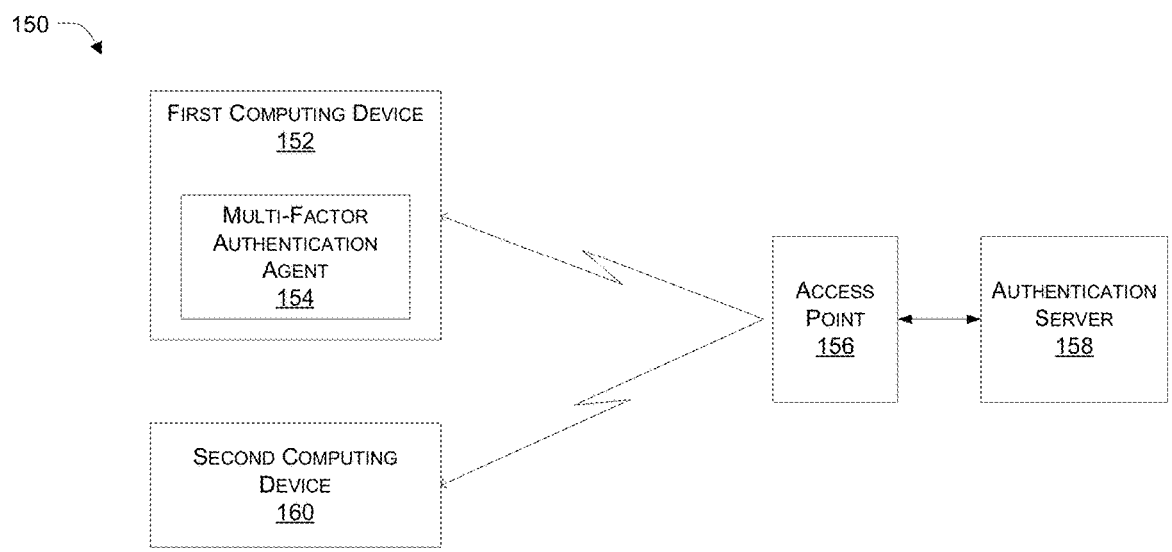
FIG. 1B illustrates a simplified wireless network architecture in which wireless multi-factor authentication may be performed in accordance with an alternative embodiment of the present invention.

FIG. 1B illustrates simplified wireless network architecture in which wireless multi-factor authentication may be performed in accordance with an alternative embodiment of the present invention. In the present example, first computing device 152 is a wireless computing device and therefore may be at different locations and connected to different wireless access points of the wireless network at different times. As such, the distance of second computing device 160 during an attempted login to first computing device 152 can be determined from a wireless access point (e.g., access point 156) that is providing connectivity to the wireless network to first computing device 152. A first distance between second computing device 152 and access point 156 and a second distance between first computing device 152 and access point 156 can be determined. In order to make a determination regarding whether to accept or reject a user authentication request to access first computing device 152, authentication sever 158 can essentially determine whether the difference between the first distance and the second distance is within a predetermined or configurable threshold, thereby being within the pre-configured radius and indicating second computing device 160 is in close proximity to first computing device 152.

In one embodiment, first computing device 152 can be a wireless computing device (e.g., a laptop, a tablet computer or the like) connected wirelessly to a wireless access point (e.g., access point 156). A user authentication request received at first computing device 152 can be processed based on the proximity of second computing device 160 to first computing device 152, wherein the proximity of second computing device 160 to first computing device 152 can be determined based on proximity of the second computing device 160 to access point 156.

In one embodiment, second computing device 160 can be pre-registered with first computing device 152 by way of authentication server 158 in a manner similar to that described above with reference to FIG. 1A. For example, during registration, first computing device 152 and second computing device 160 can be paired, and pairing information can be stored by authentication server 158. A multi-factor authentication agent 154 configured within first computing device 152 (or a soft token management system (not shown) running on second computing device 160) can enable registration of second computing device 160 with first computing device 152. During registration, TAT and/or TiF between wireless access point 156 and second computing device 160 can be determined, iteratively for some time, and an average distance between second computing device 160 and wireless access point 156 can be determined and stored by authentication server 158. The average distance between second computing device 160 is determined from a wireless access point 156 that provides wireless connectivity to the wireless network on behalf of first computing device 152. The determined average distance between second computing device 160 and wireless access point 156 may also be referred to herein as a pre-configured radius. The pre-configured radius can be stored by authentication server 158.

In one embodiment, during post-registration authentication process, on receiving a user authentication request at first computing device 152, multi-factor authentication agent 154 can send the user authentication request to authentication server 158 for processing the user authentication request. Authentication server 158 can send a distance measuring signal through access point 156 to second computing device 160 that was pre-registered with first computing device 152. Access point 156 through which distance measuring signal is sent to second computing device 160 is the one that provides wireless connectivity to the wireless network on behalf of first computing device 152, when the user authentication request is received. Second computing device 160 responds to the distance measuring signal in the background and based on the response time of second computing device 160, authentication server 158 can estimate the distance of second computing device 160 from access point 156. If the measured distance of second computing device 160 from access point 156 is within the pre-configured radius, authentication server 158 can send an affirmative response to multi-factor authentication agent 154, thereby allowing the user to access first computing device 152.

As those skilled in the art will appreciate, in one embodiment, wireless access point 156 from which the distance of second computing device 160 is measured during the authentication process may or may not be same access point that was used to determine the pre-configured radius or average distance during the registration process. As such, in one embodiment, rather than using the pre-configured radius stored during the registration process to determine whether to accept or deny a RADIUS challenge received from multi-factor authentication agent 154, authentication server 158 may use the initial RADIUS message to determine a TiF for first computing device 152 and then judge second computing device 160 (e.g., the user's smart phone) by that metric. In this manner, wireless laptop users, for example, may roam from one wireless access point to another within the wireless network and may still have the benefit of using 2FA.

According to one embodiment, when a user logs into another computer that is not associated with his/her mobile device via the enrollment process or that the user does not usually use, a push message can be sent to the mobile device from the authentication server. Responsive to receipt of the push message, the user can input a PIN or alphanumeric password to confirm their identity in logging into that particular machine.

As those skilled in the art will appreciate, the proximity-based authentication approach described herein can be used alone as part of a typical login process (in which the user provides login credentials) or can be coupled with the use of a 2FA code sent to the user's mobile device via Short Message Service (SMS), for example.

Figure 2:
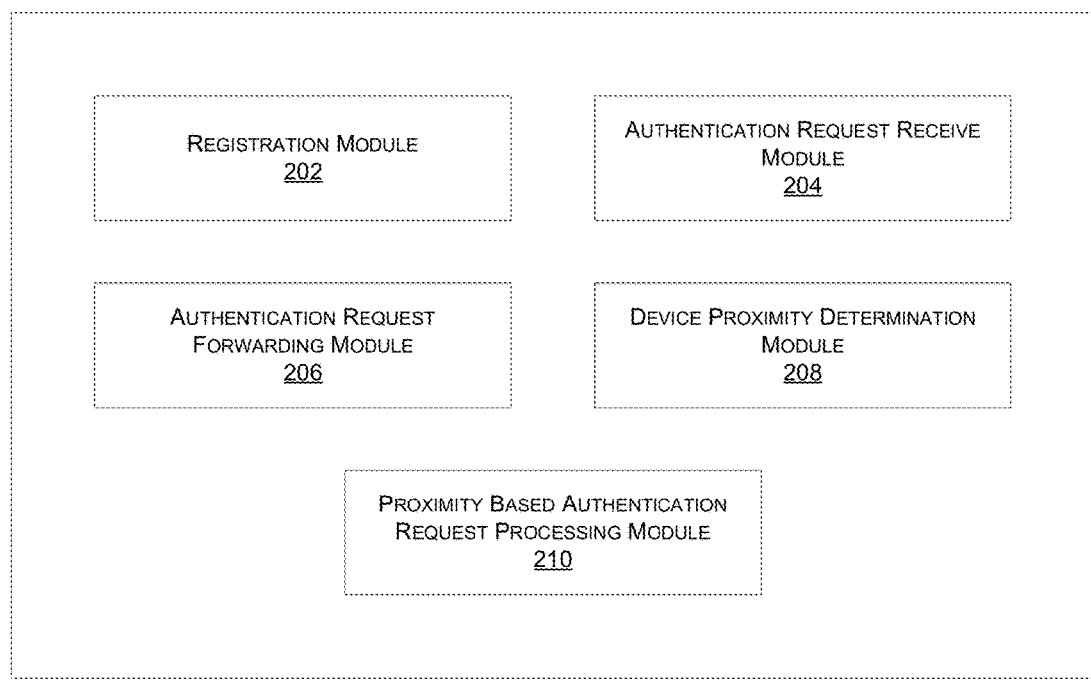
FIG. 2 illustrates exemplary functional modules of a system for performing multi-factor wireless authentication in accordance with an embodiment of the present invention.

FIG. 2 illustrates exemplary functional modules of a system 200 for performing multi-factor wireless authentication in accordance with an embodiment of the present invention. In an embodiment, system 200 includes a registration module 202 configured, at a first computing device, to enable registration or pairing of a second computing device, also referred to herein interchangeably as the companion device, with the first computing device, also referred to interchangeably herein as the primary device. Registration module 202, sends registration details to an authentication device (for example, an authentication server), which in turn calculates an average distance of the second computing device from the first computing device during the registration process. To identify the average distance of the second computing device from the first computing device, during the registration process, the distance of the second computing device, from one or more access points located near a network device providing wired connectivity to the first computing device, is measured iteratively over the course of a few seconds, for example. Along with the pairing information, the computed/determined average distance of the first computing device is configured at the authentication server. The average distance determined and configured at the authentication device during registration process is also referred to herein interchangeably as the pre-configured radius. In one embodiment, the preconfigured radius is determined, during pairing of the second computing device with first computing device, based on the average distance or the maximum distance of the second computing device to one or more wireless access points associated with a network device providing network connectivity to the first computing device.

In one embodiment, to determine the average distance of the second computing device from one or more wireless access points based on multiple rounds of determination of distance between the second computing device and one or more wireless access points. To determine distance between the second computing device and the one or more wireless access points, the authentication server may send a distance measuring signal (for example, a ping command) routed through the one or more access points and determined the distance based on acknowledge or response time of the distance measuring signal from the second computing device. The one or more access points from which the distance of the second computing device is calculated can be one located near a network device providing network connectivity to the first computing device. In an exemplary implementation, where the first computing device is wireless computing device, the network device providing network connectivity to the first computing device will be a wireless access point that forms part of the one or more wireless access points from which the distance of the second computing device is calculated.

In the present example, system 200 includes an authentication request receive module 202 configured at the first computing to receive a user authentication request from a user, and an authentication request forwarding module 204 configured to forward through an endpoint protection suite of the first computing device, the user authentication request, to an authentication device.

System 200 also includes a device proximity determination module 206 configured, at the authentication server, to determine the proximity of a second computing device to one or more wireless access points associated with a network device that is providing network connectivity to the first computing device. In one embodiment, the proximity of the second computing device to one or more wireless access points is determined based on a time-in-flight between the second computing device and the one or more wireless access points. Responsive to receiving the user authentication request, the authentication server determines whether there is a second computing device pre-registered with the first computing. If so, the authentication server may further determine whether the first computing device is a wired computing or wireless computing device.

In an embodiment, when the first computing device is a wired computing device, the authentication server determines distance of the second computing device from same wireless access point that was used during registration of the second computing device with the first computing device. For example, the authentication server can identify whether the network device providing network connectivity to the first computing device is same as the network device that was used during registration of the second computing device with the first computing device. If the network device providing network connectivity to the first computing device during the authentication process is same one used during the registration process, the authentication server can determine the distance of the second computing device during authentication process from same set of one or more access points that was used to determine the average distance of the second computing device from the one or more wireless access points used during the registrations process.

In an embodiment, when the first computing device is a wireless computing device, the authentication server may alternatively use a wireless access point that is providing wireless connectivity to the first computing device to determine the proximity of the second computing device to the first computing device. For example, as described above, rather than using the pre-configured radius stored during the registration process to determine whether to accept or deny a RADIUS challenge received from a multi-factor authentication agent running on the first computing device, the authentication server may use the initial RADIUS message to determine a TiF for the first computing device and then judge the second computing device 160 by that metric. This allows approach allows laptop users, for example, to roam from one wireless access point of the wireless network to another and still benefit from the protections of using 2FA.

System 200 further includes a proximity based authentication request processing module 208 configured, at the authentication device, to process the user authentication request based on the proximity of the second computing device to the one or more wireless access points or to the first computing device, as the case may be. The authentication device can send an affirmative response to the endpoint protection suite of the first computing device, if the proximity of the second computing device to the one or more wireless access points or to the first computing device, as the case may be, is within a preconfigured radius. The endpoint protection suite on the first computing device can approve the user authentication request responsive to receipt of the affirmative response from the authentication device.

In an embodiment, the network device providing network connectivity to the first computing device can be a network security device (e.g., a firewall, a Unified Threat Management (UTM) appliance or the like), a router, a gateway, a network switch, a hub or a wireless access point.

In an embodiment, to add another factor of authentication, system 200 can further cause a push notification to be sent to the second computing device and approve the user authentication request responsive to receipt of affirmative confirmation acknowledgement of the push notification from the second computing device. The push notification sent to the second computing device can include a device identifier and/or user identifier. For example, the push notification can include a device identifier, such as name of the first computing device, type of second computing device, location of first computing device etc. and a user identifier, such as name of the user, associated with the user authentication request. In an embodiment, the user authentication request can be part of a multi-factor authentication process. The device proximity based user authentication request can be initiated as result of an successful completion of a first factor authentication by the first computing device.

Depending upon the particular environment and implementation, the first computing device may be a desktop, a workstation, a storage device, a network server, a laptop, a wearable, a tablet, a mobile phone, a portable device, other wired computing device or a wireless computing device. In different embodiments, the second computing device can be a mobile phone, a portable hardware token, a laptop, a tablet, Bio embedded chip, a wearable device or any other wireless computing device.

In different embodiments, the authentication device can be can be a dedicated authentication server, a network security device, a firewall, a router, a switch, a gateway, a network based authentication device, a network server, or a wireless access point.

Figure 3A:
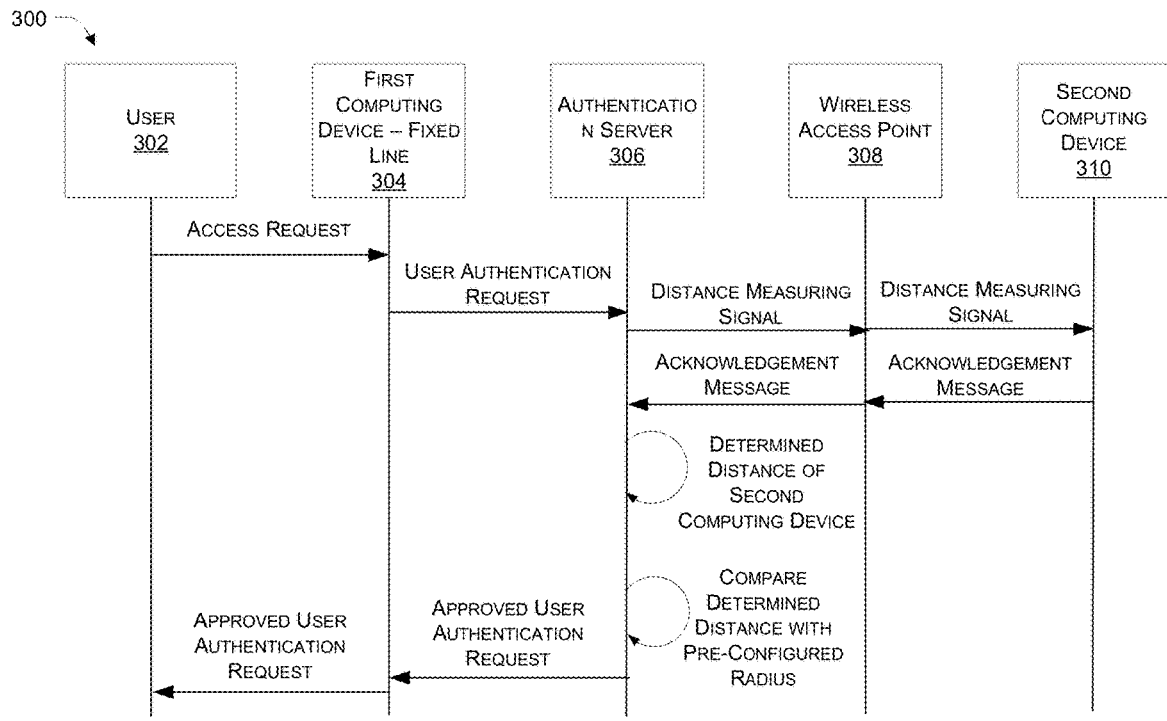
FIG. 3A is a sequence diagram illustrating performance of user authentication with a wireless multi-factor authentication approach in accordance with an embodiment of the present invention.

FIG. 3A is a sequence diagram 300 illustrating performance of user authentication with a wireless multi-factor authentication approach in accordance with an embodiment of the present invention. In the context of the present example, a user 302 can make an access request at a fixed first computing device 304 configured with a multi-factor authentication agent. Multi-factor authentication agent, for example a two factor (2FA) authentication agent, of first computing device 304 can send a user authentication request to an authentication server 306. On receiving the user authentication request, authentication server 306 sends a distance measuring signal through wireless access point 308 to a second computing device 310, to determine a distance of second computing device 310 from first computing device 304. To determine the distance or proximity of second computing device 310 from first computing device 304, authentication server 306 determines a distance of second computing device 310 from wireless access point 308 that is located near a network device providing network connectivity to first computing device 304. To determine the distance between second computing device 310 and wireless access point 308, authentication server 306 may send a distance measuring signal to second computing device 310 through wireless access point 308. Responsive to receipt of the distance measuring signal, second computing device 310 can send an acknowledgement message through wireless access point 308 to authentication server 306. Based on the response time to the distance measuring signal received from second computing device 310 at wireless access point 308, the distance of second computing device 310 from wireless access point 308 can be calculated or may simply be stored in the form of a time delay. Authentication server 306 can compare the determined distance of second computing device 310 from wireless access point 308 with a pre-configured radius. When the determined distance is within the pre-configured radius, authentication server 306 can approve the user authentication request and send an access granted signal/message to a multi-factor authentication agent of first computing device 304, that in turn approves the user access request.

Figure 3B:
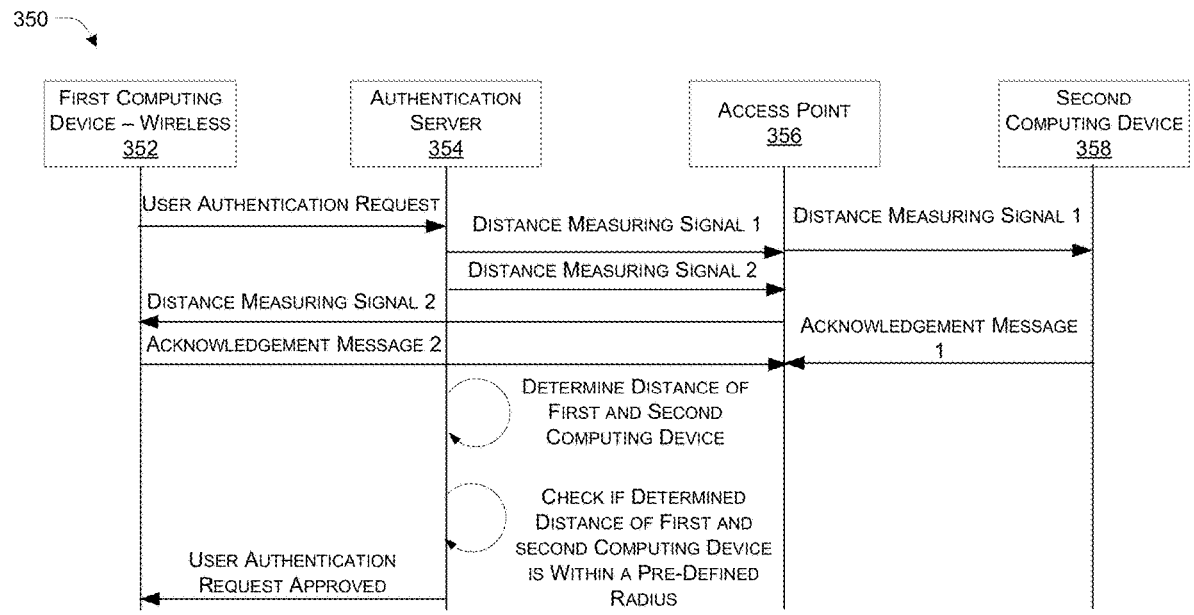
FIG. 3B is a sequence diagram illustrating performance of user authentication with a wireless multi-factor authentication approach in accordance with an alternative embodiment of the present invention.

FIG. 3B is a sequence diagram 350 illustrating performance of user authentication with a wireless multi-factor authentication approach in accordance with an alternative embodiment of the present invention. In the context of the present example, a multi-agent authentication agent running on a first computing device 352 that is a wireless computing device can forward a user authentication request to an authentication server 354. Authentication server 354 can determine the distance between first computing device 352 and a pre-registered second computing device 358 by determining a distance of first computing device 352 and second computing device 358 from a common wireless access point 356. As shown in FIG. 3B, on receipt of the user authentication request, authentication server 354 can send a first distance measuring signal (distance measuring signal 2) to first computing device 352 and a second distance measuring signal (distance measuring signal 1) to second computing device 358 through wireless access point 356. Wireless access point 356 is the one that is providing wireless connectivity to first computing device 358. Both first computing device 352 and second computing device 358 send respective acknowledgements of the distance measuring signals through wireless access point 356 to authentication server 354. In an embodiment, authentication server 354 determines a distance from wireless access point 356 to first computing device 352 and second computing device 358 respectively, and compares the determined distances to check if the determined distance of second computing device 358 from wireless access point 356 is within a preconfigured radius. If the determined distance of second computing device 358 from wireless access point 356 is within the preconfigured radius, authentication server 354 communicates approval of the user authentication request to first computing device 352. As noted above, in one embodiment, authentication server 354 may determine whether to accept or deny a RADIUS challenge received from the multi-factor authentication agent by using the initial RADIUS message (i.e., the user authentication request) to determine a TiF for first computing device 352 and then judge second computing device 358 by that metric.

Figure 4:
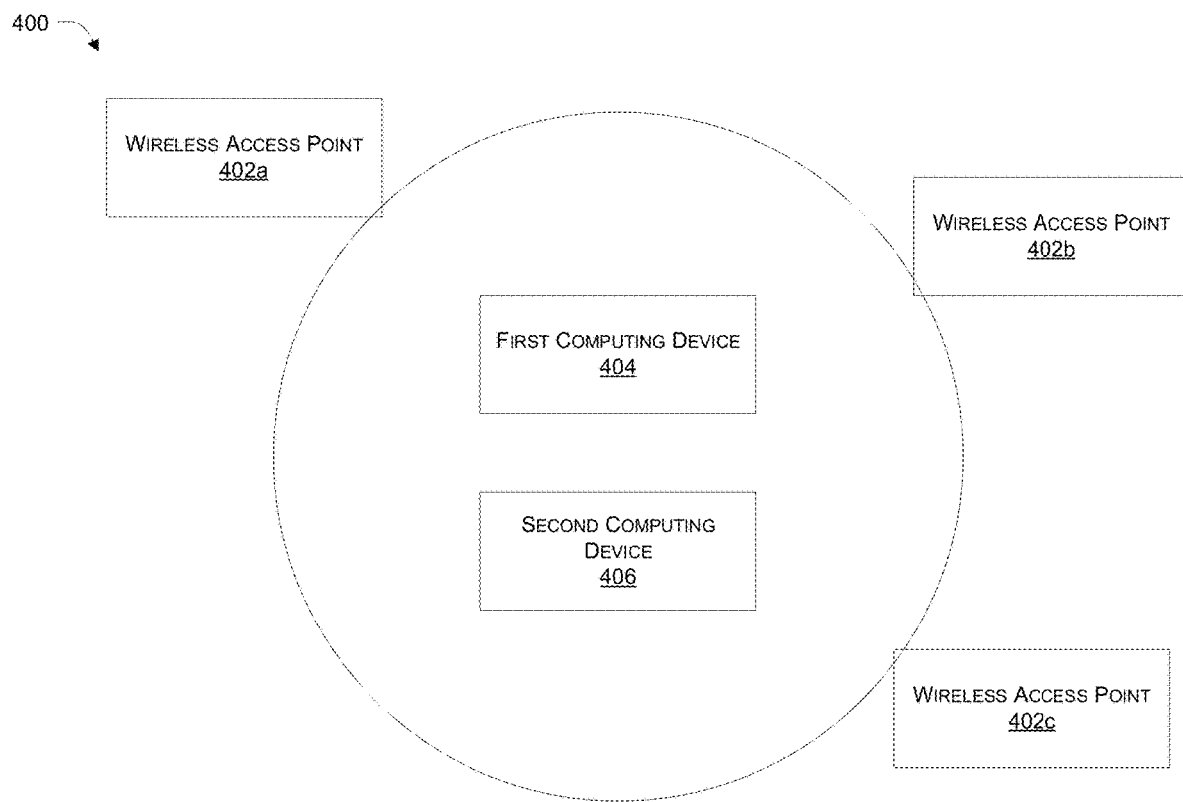
FIG. 4 is a simplified block diagram illustrating a triangulation-based approach for determining the proximity of a registered mobile device to a fixed client device or a wireless client device to which a user of the registered mobile device is attempting to access in accordance with an embodiment of the present invention.

FIG. 4 is a simplified block diagram 400 illustrating a triangulation-based approach for determining the proximity of a registered mobile device to a fixed client device or a wireless client device to which a user of the registered mobile device is attempting to access in accordance with an embodiment of the present invention. In an embodiment, the proximity of a registered second computing device 406, (for example, a mobile phone) from a first computing device 404 that is fixed, wireline connected computing device (for example, a desktop computer) can be determined using a triangulation-based approach, wherein the distance of second computing device 406 is determined from three or more wireless access points, such as wireless access point 402a, wireless access point 402b and wireless access point 402c. When the distance of second computing device 406 is measured independently from each of wireless access points 402a-c, the location of second computing device 406 can be determined more accurately. When first computing device 404 is a fixed computing device, the wireless access points 402a-c from which the distance of second computing device 406 is determined are those that are located near the network device providing network connectivity to first computing device 404. Alternatively, when first computing device 404 is a wireless device and may be provided with wireless connectivity to the wireless network by different wireless access points at different times depending upon its current location, the wireless access points 402a-c, from which the distance of second computing device 406 is determined are those that are located near first computing device 404.

Figure 5:
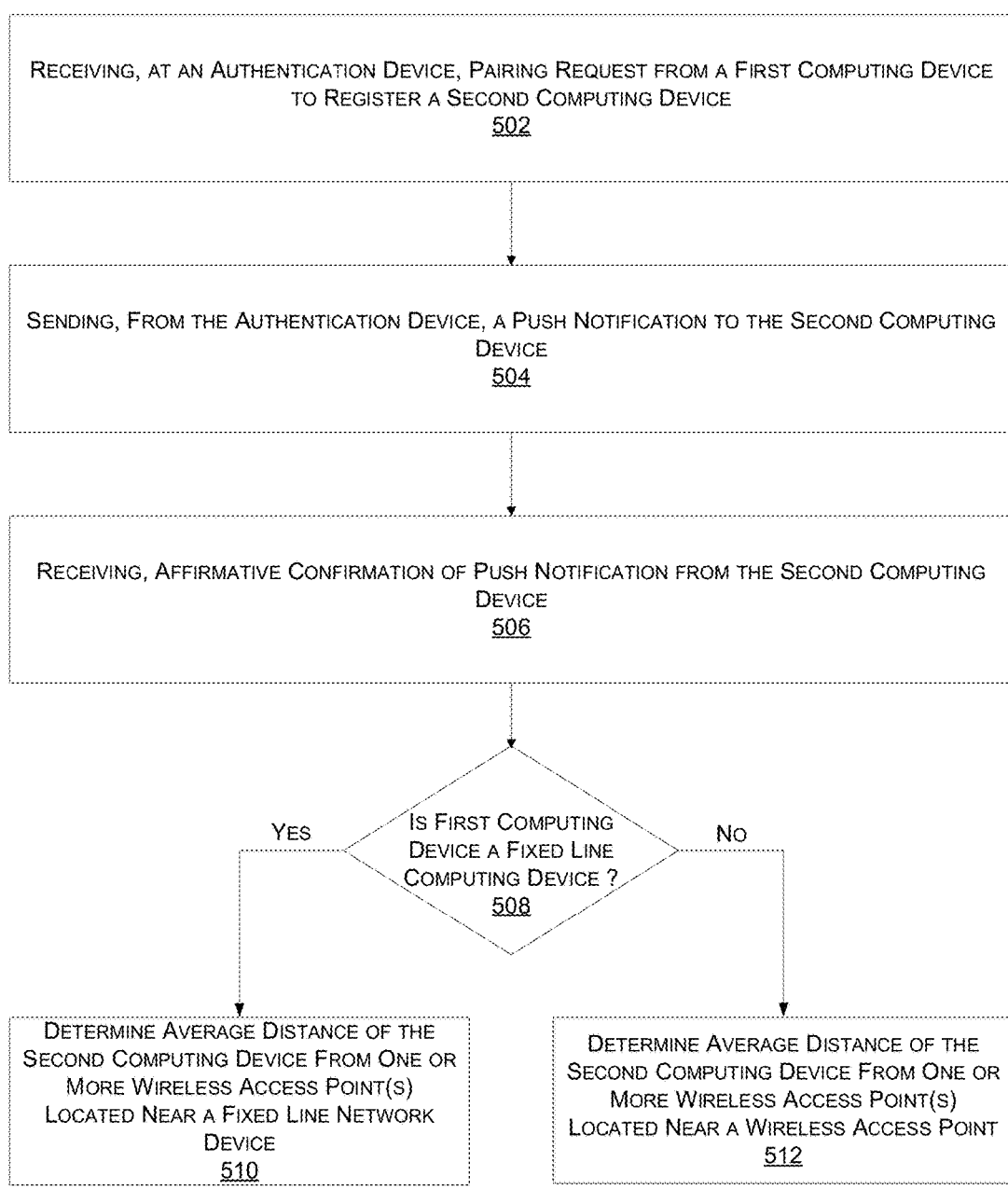
FIG. 5 is a flow diagram illustrating registration of a mobile device for use in connection with wireless multi-factor authentication in accordance with an embodiment of the present invention.

FIG. 5 is a flow diagram 500 illustrating registration of a mobile device for use in connection with wireless multi-factor authentication in accordance with an embodiment of the present invention. The registration process includes steps of receiving, at an authentication device, a pairing request from a first computing device to register a second computing device, as show at step 502, to process a user authentication request at the first computing device based on the proximity of the second computing device, and sending from the authentication device, a push notification to the second computing device, as shown at step 504, wherein the second computing device is the one that the user wants to pair the first computing device. The registration process further includes the step of receiving an affirmative confirmation of the push notification indicating that the user is willing to pair the second computing device with first computing device, as shown at step 506, checking if the first computing device is a fixed line computing device as shown at step 508, and determining an average distance of the second computing device from one or more wireless access points located near a fixed line network device providing network connectivity to the first computing device, as show at step 510. When the first computing device is a wireless computing device, the method includes the steps of determining, an average distance of the second computing device from one or more wireless access point located near a wireless access point providing wireless connectivity to the first computing device as show at step 512. The average distance of the second computing device from one or more wireless access points is determined through multiple iterations of TAT or TiF measurement between the one or more wireless access points and the second computing device. The determined average distance of the one or more wireless access points from the second computing device is configured at the authentication device as pre-configured radius.

Figure 6:
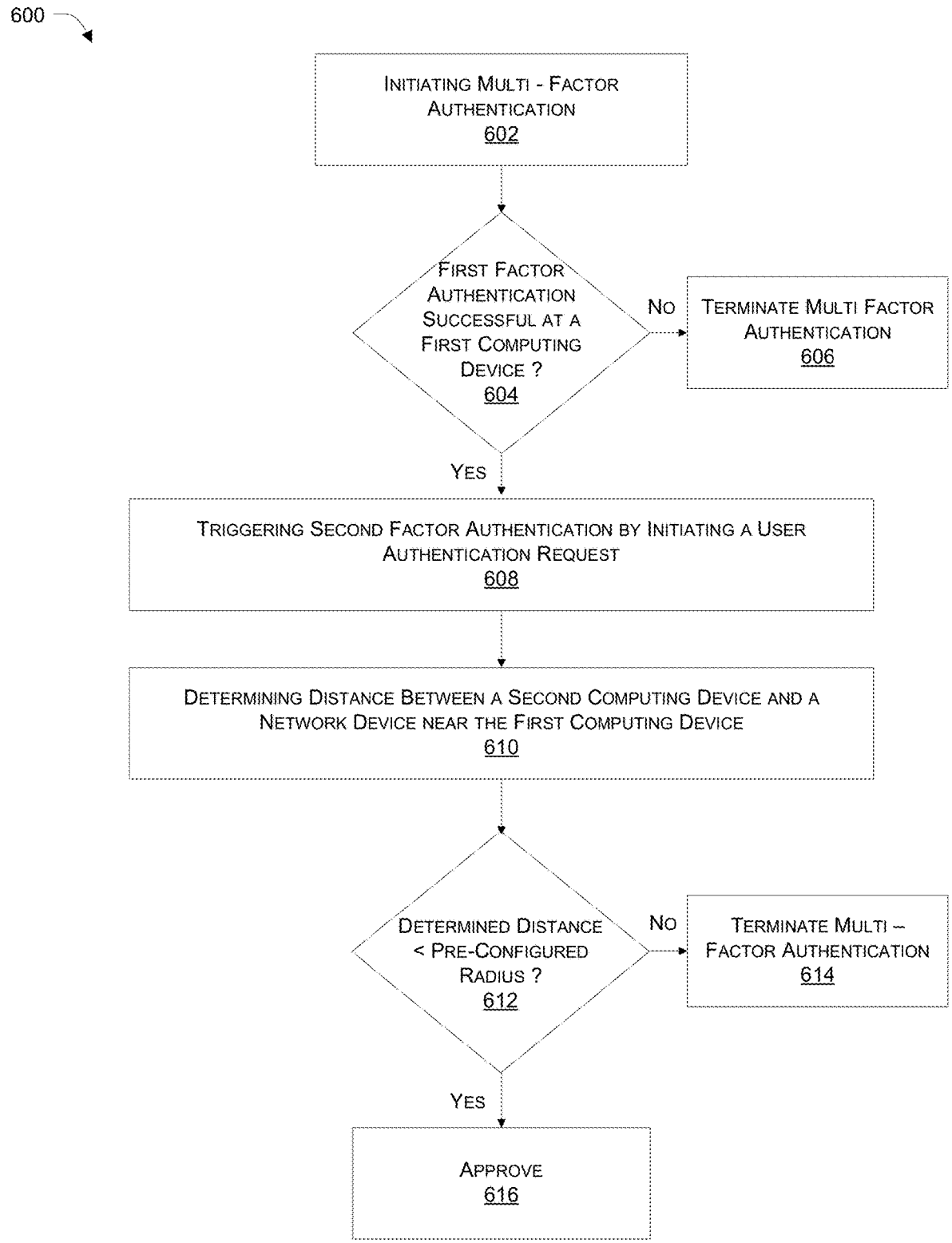
FIG. 6 is a high-level flow diagram illustrating wireless multi-factor authentication processing in accordance with an embodiment of the present disclosure.

FIG. 6 is a high-level flow diagram 600 illustrating wireless multi-factor authentication processing in accordance with an embodiment of the present disclosure. In the context of the present example, a multi-factor authentication process can include the step of initiating the multi-factor authentication process as shown at step 602, processing and determining whether a first factor authentication process is successful at the first computing device, as shown at step 604, and triggering a second factor authentication process by initiating a proximity based user authentication process as shown at step 608. When the first factor authentication is not successfully completed, the multi-factor authentication request can be terminated as shown at step 606. To process the second factor authentication, the multi-factor authentication processing includes further steps of determining a distance between a second computing device registered with the first computing device and one or more wireless access points located near the first computing device as shown at step 610, and comparing if the determined distance is within the pre-configured radius as show at step 612. If the determined distance is within the pre-configured radius, the multi-factor authentication request is approved as shown at step 616; otherwise, the multi-factor authentication request is terminated as shown at step 614.

Figure 7:
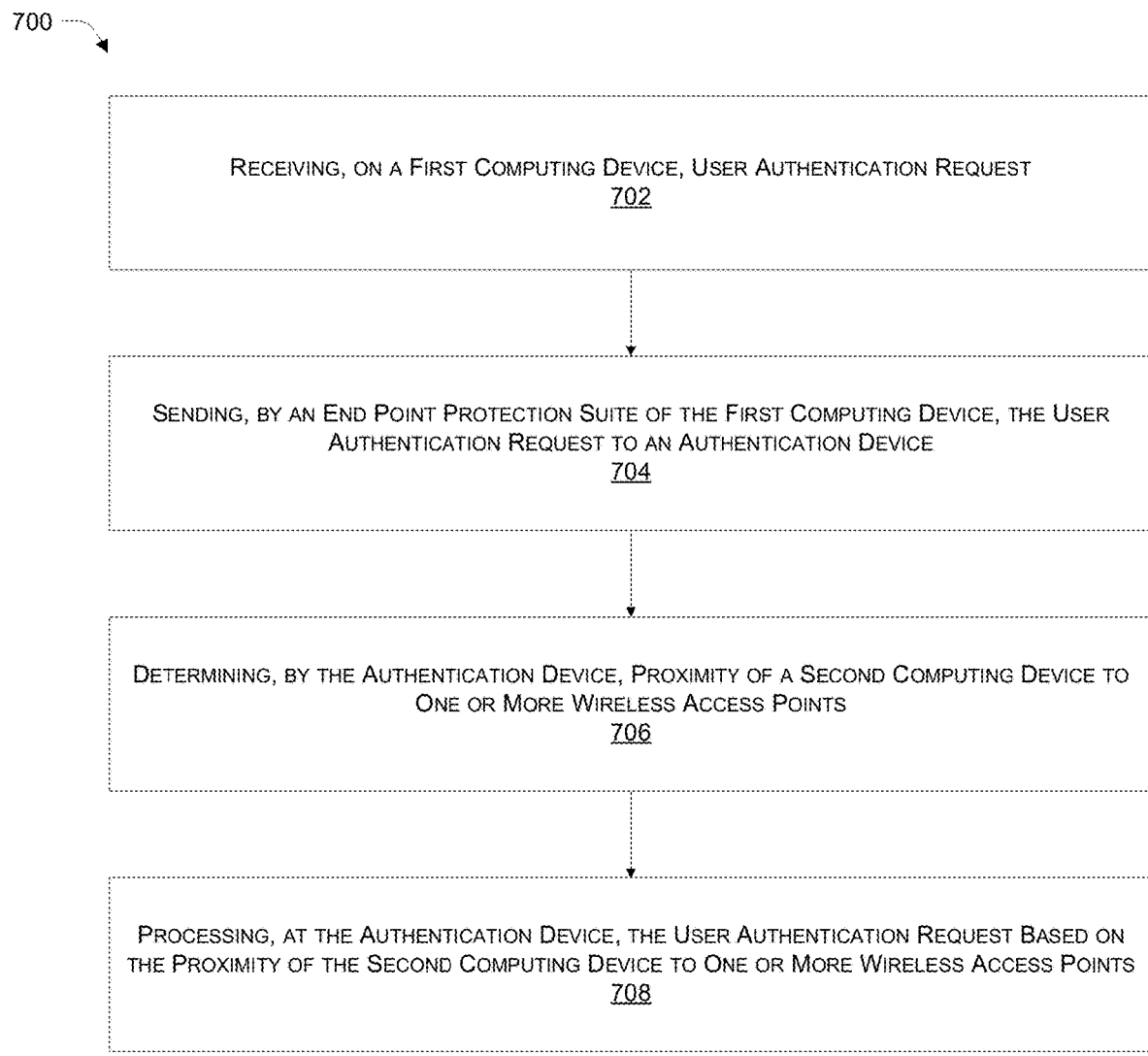
FIG. 7 is a flow diagram illustrating device proximity based authentication processing in accordance with an embodiment of the present disclosure.

FIG. 7 is a flow diagram 700 illustrating device proximity based authentication processing in accordance with an embodiment of the present invention. The device proximity based authentication process can include the steps of receiving, by a first computing device, a user authentication request, as shown at step 702, sending, by an endpoint protection suite of the first computing device, the user authentication request, to an authentication device, as shown at step 704, determining, by the authentication device, the proximity of a second computing device to one or more wireless access points as shown at step 706, and processing, at the authentication device, the user authentication request based on the proximity of the second computing device to the one or more wireless access points, as shown step 708. In an embodiment, the authentication device sends an affirmative response to the endpoint protection suite of the first computing device if the proximity of the second computing device to the one or more wireless access points is within a preconfigured radius.

In an embodiment, the one or more wireless access point from which the distance of the second computing device is determined are the wireless access points associated with a network device providing network connectivity to the first computing device. In an embodiment, the network device providing network connectivity to the first computing device is a wireless access point that is among one or more wireless access points from which the distance of the second computing device is determined. In an embodiment, the second computing device used for processing the authentication request can be a pre-registered computing device at the authentication device with the first computing device.

Figure 8:
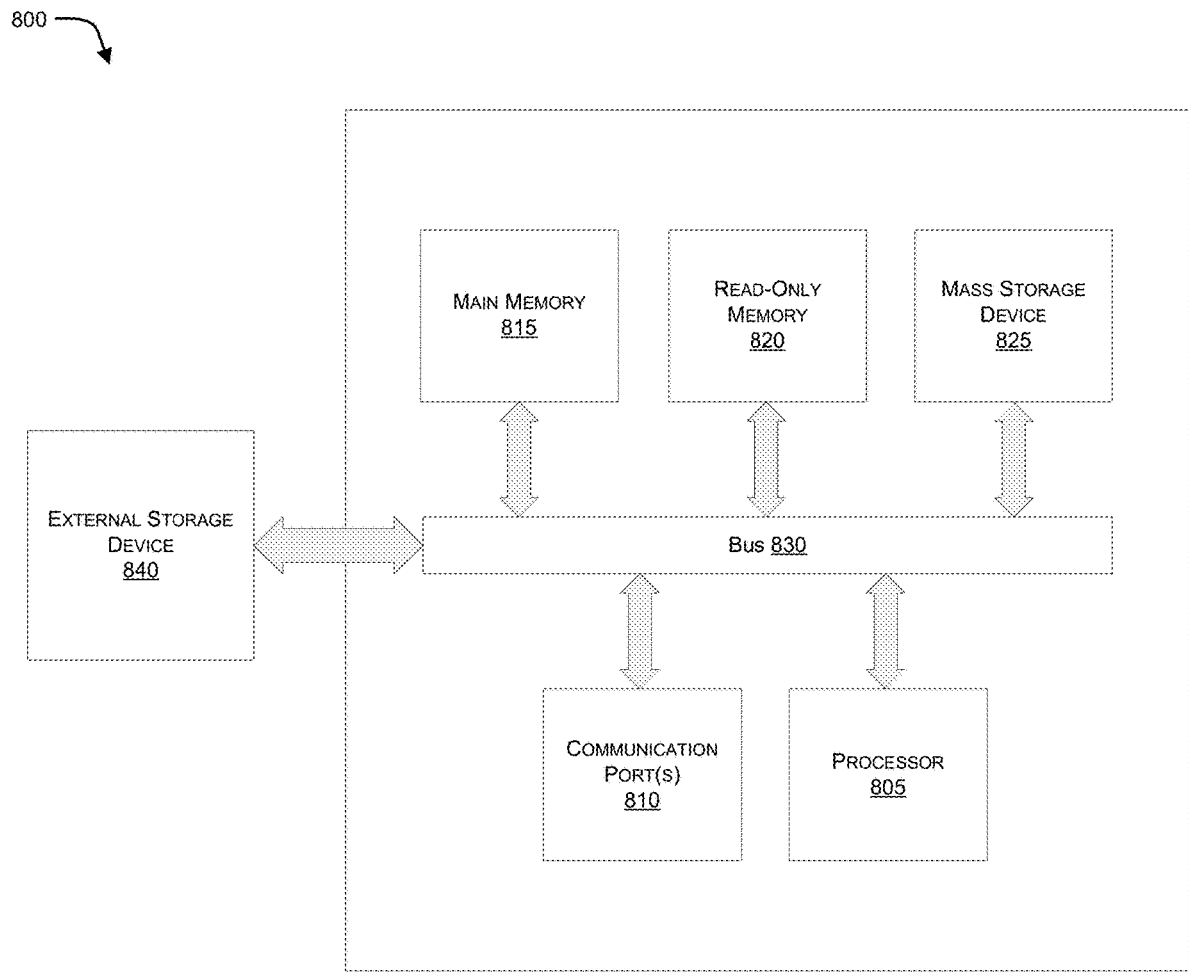
FIG. 8 illustrates an exemplary computer system in which or with which embodiments of the system of the present disclosure may be utilized.

FIG. 8 illustrates an exemplary computer system in which or with which embodiments of the system of the present disclosure may be utilized. The computer system 800 can be configured for implementation of one or more portions of system 200 and execution of one or more steps of flow diagrams 500, 600 or 700. As such, computer system may be representative of one or more of a primary computing device (e.g., first computing device 102, 152, 304, 352, 404), a companion computing device (e.g., second computing device 112, 160, 310, 358 or 406) and an authentication device (e.g., authentication server 108, 158, 306 or 354).

Embodiments of the present disclosure include various steps, which have been described in detail above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 800 includes a bus 830, a processor 805, communication port 810, a main memory 815, a removable storage media 840, a Read-Only Memory (RAM) 820 and a mass storage 825. A person skilled in the art will appreciate that computer system 800 may include more than one processor and communication ports.

Examples of processor 805 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 805 may include various modules associated with embodiments of the present invention.

Communication port 810 can be any of an RS-232 port for use with a modem based dialup connection, a 10/100 Ethernet port, a Gigabit or 10 Gigabit port using copper or fiber, a serial port, a parallel port, or other existing or future ports. Communication port 810 may be chosen depending on a network, such a Local Area Network (LAN), Wide Area Network (WAN), or any network to which computer system 800 connects.

Memory 815 can be Random Access Memory (RAM), or any other dynamic storage device commonly known in the art. Read only memory 820 can be any static storage device(s) such as, but not limited to, a Programmable Read Only Memory (PROM) chips for storing static information such as start-up or BIOS instructions for processor 805.

Mass storage 825 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 830 communicatively couple processor(s) 805 with the other memory, storage and communication blocks. Bus 830 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 705 to system memory.

Optionally, operator and administrative interfaces, such as a display, keyboard, and a cursor control device, may also be coupled to bus 830 to support direct operator interaction with computer system 800. Other operator and administrative interfaces can be provided through network connections connected through communication port 810.

Removable storage media 840 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices can exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. The terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C ... and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While embodiments of the present invention have been illustrated, and described, it will be clear that the invention is not limited to these embodiments only. Numerous modifications, changes, variations, substitutions, and equivalents will be apparent to those skilled in the art, without departing from the spirit and scope of the invention, as described in the claim.

What is claimed is:

1. A method comprising:
    receiving, by an authentication server, a request to register a companion computer system of a user with a primary computer system associated with a private network, wherein the companion computer system is to be used as a factor of a multi-factor authentication process in connection with obtaining access to the primary computer system;
    registering, by the authentication device, the companion computer system with the primary computer system by:
        determining a distance of the companion computer system from one or more wireless access points of a wireless network of the private network at a time of registration;
        storing a set of registration information, including the distance and unique device identification information associated with the companion computer system; and
        associating the stored set of registration information with the primary computer system;
    subsequent to said registering, receiving, by the authentication device, a user authentication request in connection with an attempt to access the primary computer system;
    responsive to receipt of the user authentication request:

retrieving, by the authentication device, the set of registration information;

determining a current distance of the companion computer system from the one or more wireless access points associated with the attempt to access the primary computer system;

when a difference between the current distance and the distance stored within the registration information is within a configurable or predefined threshold, then communicating to the primary computer system, by the authentication device, approval of the user authentication request; and when the difference exceeds the configurable or predefined threshold, then communicating to the primary computer system, by the authentication device, rejection of the user authentication request.

2. The method of claim 1, wherein said determining a distance of the companion computer system from one or more wireless access points comprises:

sending, by the authentication device, a first push notification to the companion computer system;

receiving, by the authentication device, a first acknowledgement of the first push notification from the companion computer system; and determining, by the authentication device, a first time-in-flight of the first acknowledgement between the companion computer system and the one or more wireless access points.

3. The method of claim 1, wherein said determining a current distance of the companion computer system from the one or more wireless access points comprises:

sending, by the authentication device, a second push notification to the companion computer system;

receiving, by the authentication device, a second acknowledgement of the second push notification from the companion computer system; and determining, by the authentication device, a second time-in-flight of the second acknowledgement between the companion computer system and the one or more wireless access points.

4. The method of claim 1, wherein the primary computer device comprises a desktop computer, a laptop computer or a tablet computer.

5. The method of claim 1, wherein the companion computer system comprises a mobile phone, a portable hardware token or a wearable device.

6. An authentication system comprising:

a processor; and a non-transitory computer-readable medium, coupled to the processor, having stored therein instructions that when executed by the processor cause the processor to:

receive a request to register a companion computer system of a user with a primary computer system associated with a private network, wherein the companion computer system is to be used as a factor of a multi-factor authentication process in connection with obtaining access to the primary computer system;

register the companion computer system with the primary computer system by:

determining a distance of the companion computer system from one or more wireless access points of a wireless network of the private network at a time of registration;

storing a set of registration information, including the distance and unique device identification information associated with the companion computer system; and associating the stored set of registration information with the primary computer system;

subsequent to said registering the companion computer system with the primary computer system, receive a user authentication request in connection with an attempt to access the primary computer system;

responsive to receipt of the user authentication request:

retrieve the set of registration information;

determine a current distance of the companion computer system from the one or more wireless access points associated with the attempt to access the primary computer system;

when a difference between the current distance and the distance stored within the registration information is within a configurable or predefined threshold, then communicate to the primary computer system approval of the user authentication request; and when the difference exceeds the configurable or predefined threshold, then communicate to the primary computer system rejection of the user authentication request.

7. The authentication system of claim 6, wherein determination of the distance of the companion computer system from one or more wireless access points comprises:

sending a first push notification to the companion computer system;

receiving a first acknowledgement of the first push notification from the companion computer system; and determining a first time-in-flight of the first acknowledgement between the companion computer system and the one or more wireless access points.

8. The authentication system of claim 6, wherein determination of the current distance of the companion computer system from one or more wireless access points comprises:

sending a second push notification to the companion computer system;

receiving a second acknowledgement of the second push notification from the companion computer system; and determining a second time-in-flight of the second acknowledgement between the companion computer system and the one or more wireless access points.

9. The authentication system of claim 6, wherein the primary computer device comprises a desktop computer, a laptop computer or a tablet computer.

10. The authentication system of claim 6, wherein the companion computer system comprises a mobile phone, a portable hardware token or a wearable device.

* * * * *